United States Patent
Pettis

(10) Patent No.: US 6,586,077 B1
(45) Date of Patent: Jul. 1, 2003

(54) TEMPERABLE PATTERNED GLASS ARTICLES AND METHODS OF MAKING SAME

(75) Inventor: James T. Pettis, Al-Jubail (SA)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/499,043

(22) Filed: Feb. 7, 2000

(51) Int. Cl.$^7$ .............................................. B32B 23/02
(52) U.S. Cl. ........................... 428/192; 428/81; 65/112; 52/306; 52/605; 52/171; 52/311.1; 52/586.1; 52/308; 52/800.14; 52/788.1; 404/34
(58) Field of Search ..................... 156/63, 292; 428/38, 428/78, 34.3, 192, 423.1, 538, 15, 48, 81, 122; 404/34; 446/85; 65/62, 105, 112; 52/311.1, 314, 586.1, 308, 793.11, 800.14, 307, 788.1, 790.1, 455, 306, 605, 171

(56) References Cited

U.S. PATENT DOCUMENTS

| 21,896 A | 10/1858 | Miles |
| 370,176 A | 9/1887 | Brogan et al. |
| 370,178 A | 9/1887 | Brogan et al. |
| 599,716 A | 3/1898 | Lutwyche |
| D34,843 S | 7/1901 | Walsh, Jr. |
| 720,138 A | 2/1903 | Hartung |
| 720,139 A | 2/1903 | Hartung |
| 737,707 A | 9/1903 | Chance |
| 1,528,194 A | 3/1925 | Burgess |
| 1,920,503 A | 8/1933 | Hadley |
| 2,108,811 A | 2/1938 | Fisher |
| 2,111,569 A | 3/1938 | Mulford |
| 2,145,930 A | 2/1939 | Herron |
| 2,168,287 A | 8/1939 | Favaron |
| 2,173,213 A | 9/1939 | Maul |
| 2,187,329 A | 1/1940 | Roney et al. |
| 2,242,872 A | 5/1941 | Rolph |
| 2,812,691 A | 11/1957 | Boyd |
| 2,863,534 A | 12/1958 | Gillespie |
| 2,931,468 A | 4/1960 | Keller |
| 2,981,382 A | 4/1961 | Keller |
| 3,180,780 A | 4/1965 | Ritter |
| 3,183,140 A | 5/1965 | Gibson |
| 3,238,031 A | 3/1966 | Nikoll |
| 3,238,679 A | 3/1966 | Capoccia |
| 3,252,260 A | 5/1966 | Mills |
| 3,308,593 A | 3/1967 | Smith |
| 3,946,531 A | 3/1976 | Armstrong |
| 4,109,432 A | 8/1978 | Pilz |
| 4,164,598 A | 8/1979 | Wilhelm |
| 4,518,446 A | * 5/1985 | Drennan ...................... 156/63 |
| 4,702,056 A | 10/1987 | Carey |
| 4,719,735 A | 1/1988 | Fleming, Jr. et al. |
| 4,783,938 A | 11/1988 | Palmer |
| 4,813,990 A | * 3/1989 | Thorn ......................... 65/105 |
| 4,843,772 A | * 7/1989 | Lisa ............................ 52/308 |
| 4,890,438 A | 1/1990 | Tosa et al. |
| 4,891,925 A | 1/1990 | Carlson et al. |
| 4,989,384 A | 2/1991 | Kinghorn et al. |
| 5,038,542 A | 8/1991 | Kline |
| 5,061,531 A | 10/1991 | Catalano |
| 5,079,886 A | 1/1992 | Downs |
| D336,961 S | 6/1993 | Carlson et al. |
| 5,622,019 A | 4/1997 | Dorough, Jr. |
| 5,687,521 A | * 11/1997 | Carlson et al. ............... 52/308 |

FOREIGN PATENT DOCUMENTS

CA  968117  5/1975

* cited by examiner

Primary Examiner—Merrick Dixon
(74) Attorney, Agent, or Firm—Hall, Priddy, Myers & Vande Sande

(57) ABSTRACT

A sheet of glass having impressed therein a grid pattern which simulates a stacked series of glass blocks joined by mortar at their joints, in which the grid pattern is confined to certain tolerances so that the sheet is temperable and at the same time creates the desired glass block appearance.

17 Claims, 4 Drawing Sheets

TEMPERABLE PATTERNED GLASS ARTICLES AND METHODS OF MAKING SAME

This invention relates to decorative glass which, though patterned to simulate mortared glass block, is temperable. This invention further relates to methods of making such articles as well as tempered patterned glass products made therefrom.

BACKGROUND OF THE INVENTION

Patterned glass and techniques for making such glass have generally been known for over a century. Examples of such known patterned glass and techniques for making them may be found in the following patents:

U.S. Pat. Nos.

21,896
34,843
370,176
370,178
720,138
720,139
737,707
1,528,194
3,183,140
5,622,019.

As can be seen from certain of these prior art patents, such as U.S. Pat. Nos. '176; '178; '194; and much more recently '019 (all employing generally similar techniques), one or more rollers are employed to imprint within either (or both) of the top or bottom planar surface of the glass a desired pattern, e.g. to simulate stacked glass blocks. For example, in the '019 patent (see FIG. 2 of the '019 patent) dual rollers (top/bottom) impress between them a softened sheet of-glass thereby imprinting in the glass a block-like grid with a wavy pattern therebetween. Few operating parameters are given and temperability is not disclosed.

In another example, the '176 patent employs a smooth top roller when impressing a ridge pattern into the lower planar surface of the glass sheet that has been placed on an appropriately grooved table. This patent also discloses the prior use of a grooved top roller and a smooth casting table on which the glass sheet resides. No operating parameters or depth of grooves or height of sheet ridges is given.

In yet another example, the above-listed '178 patent teaches to achieve a ridged pattern and a wavy-like pattern with dual, top rollers, one of which has formed in it the ridge pattern to be impressed in the sheet, while the other is provided with a wavy pattern impressed in the blocks outlined by the ridges. Once again no operating parameters or depth of roller grooves or height of sheet ridges or wavy pattern penetration is given. The underside surface of the sheet is maintained smooth by employing a smooth table top beneath the rollers. In the '194 patent, as a still further example, a top roller with grid patterned ribs is employed to impress a series of grooves into the top of a softened glass sheet, thus forming a grid pattern of grooves which seek to simulate glass blocks (or tiles).

As can be seen from the above, one known technique seeks to simulate a grid by ridges, while another does so with grooves. Each is desirous of creating a grid-like appearance, but none, except the '019 patent, establishes a depth of groove or height of ridge for doing so. None, moreover, teach the ability to temper, or how to temper such a patterned array. This noticeable absence of any reference to the ability to temper marks a significant, commercially inhibiting problem in the prior art, and demonstrates the unique improvement achieved by this invention. In this respect, the more modern '019 patent does teach that its grooves are to extend to a depth of ¼ inch into the planar surface of the glass. This simply serves to highlight the commercially inhibited nature of block simulating sheet glass heretofore known in the art. Because of the intolerance of glass. having high angular dimensional changes in its surface structure, to tempering, this depth of ¼ inch virtually assures that the sheet is not temperable in that it will likely fail (break in unacceptably large numbers) either during tempering or later in use even if and in the unlikely event that, it survives the tempering process.

Tempered glass in modern architecture is not just a desirable product. It may also be mandatory to use in certain instances, particularly when various safety codes or common sense seek to protect against the severe lacerations that can occur from the breaking of untempered glass. Thus, for example, the use of the more expensive tempered form of decorative windows, glass shower stall doors, or sheets of glass used as interior walls is often required or economically justifiable, thereby creating a significant need in the art for a reliably temperable patterned glass sheet which may be used by itself or in aesthetically matchable form with its tempered counterpart.

The problem when seeking to manufacture a commercially acceptable simulated glass block pattern, temperable or not, is actually twofold. First, one must achieve temperability to satisfy the need in the marketplace (e.g. for safety) as above-described. Second, a consistent and aesthetically pleasing simulating pattern at least approaching the appearance of a true stack of glass blocks separated by mortar must be achieved. Due to the nature of tempering and its intolerance to abrupt changes in surface direction, it has been found that these two requirements, i.e. appearance vs. temperability are in conflict, and one cannot be achieved without eliminating the other.

It is rather apparent from the above that there exists a need in the art for an aesthetic, simulated, reliably temperable glass block patterned sheet of glass, as well as a method of making same, which meets the various architectural and safety needs in the wall, door and window art as above-described. It is a purpose of this invention to fulfill this and other needs in the art which will become more apparent to the skilled artisan once given the following disclosure.

SUMMARY OF THE INVENTION

It is a finding of this invention that if the grooves or ridges (and any other pattern if used therewith and also impressed into the surface of a glass sheet) are carefully constructed so as to fall within a certain, heretofore unrecognized and rather precise range of dimensions as to their maximum depth or height below or above, respectively, the plane defined by the planar surface of the glass sheet in which they are formed, the patterned sheet so formed may be both tempered and yet, to the naked eye, present an aesthetically pleasing and acceptably simulating appearance of a plurality of stacked glass blocks.

In certain preferred embodiments, by properly forming the grooves or ridges to an appropriate width and creating in their lateral upper (outer) planar surfaces a granular pattern, two enhancing effects are achieved without negating temperability. First, the granular appearance and its resulting diffusion of light serve to highlight (i.e. better offset, optically) the block-like nature of the overall grid pattern formed. Second, the granular nature of the pattern, appropriately accomplished, simulates the mortar (adhesive) normally employed to form the joints between blocks when constructing a wall from real glass blocks, thereby bringing the appearance of the wall more in line with a real glass block wall or window or door, and away from the artificial simulation that, in fact, it is.

It has been found, in this respect, that for most glasses contemplated, principally clear or colored glass of conventional window glass composition (e.g. a conventional or known soda-lime-silica glass), that if the ridges are maintained at a height less than, or the grooves to a depth less than, about 0.03 inches, and preferably less than 0.016 inches (e.g. 0.0156 inches) with respect to the basic planar surface of the glass sheet, both temperability and an aesthetically pleasing glass block appearance results. The same dimensional limits hold true, in this respect, for any wavy pattern in the block surface itself or in forming a mortar-like granular pattern in the grid region (as described more fully below). In this respect, ridges are preferred rather than grooves. In either event, by adhering to these dimensional limits it has been found that the patterned sheets so formed not only achieve the appearance intended but are quite tolerant of the tempering process, resulting in high yields (low breakage losses) during tempering and create no undue risk of spontaneous failure in normal use when tempered, over their anticipated lifetime, yet are truly tempered as that term is understood in the glass art.

This invention will now be described with respect to certain embodiments thereof as illustrated in the following drawings, wherein:

IN THE DRAWINGS

DETAILED DESCRIPTION OF CERTAIN EMBODIMENTS

Figure 5:
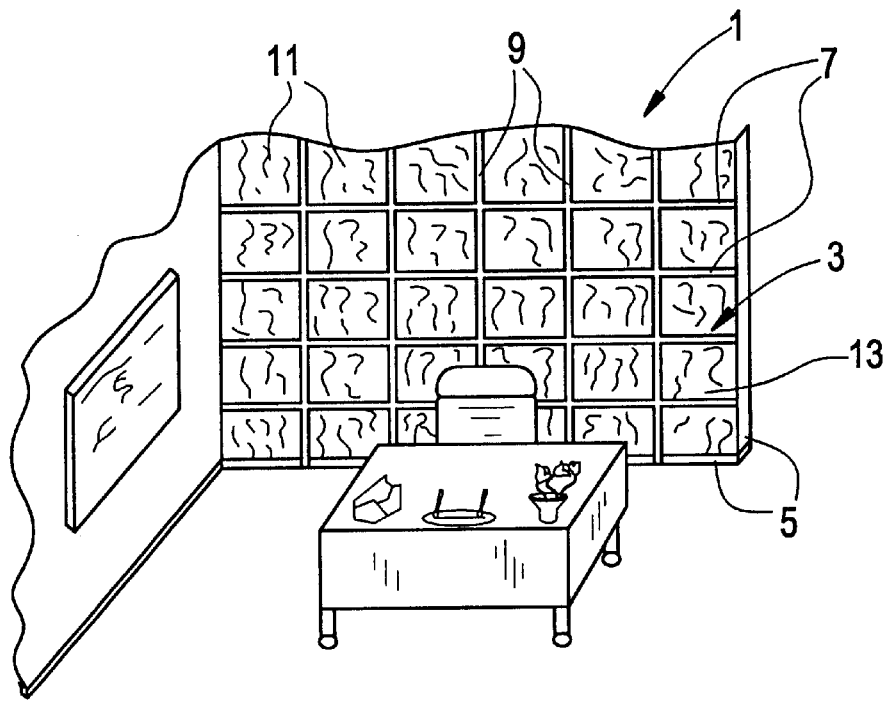
FIG. 5 is a partial illustration of a typical professional's office employing as a wall therein a tempered glass block simulating sheet of glass according to this invention.
Figure 6:
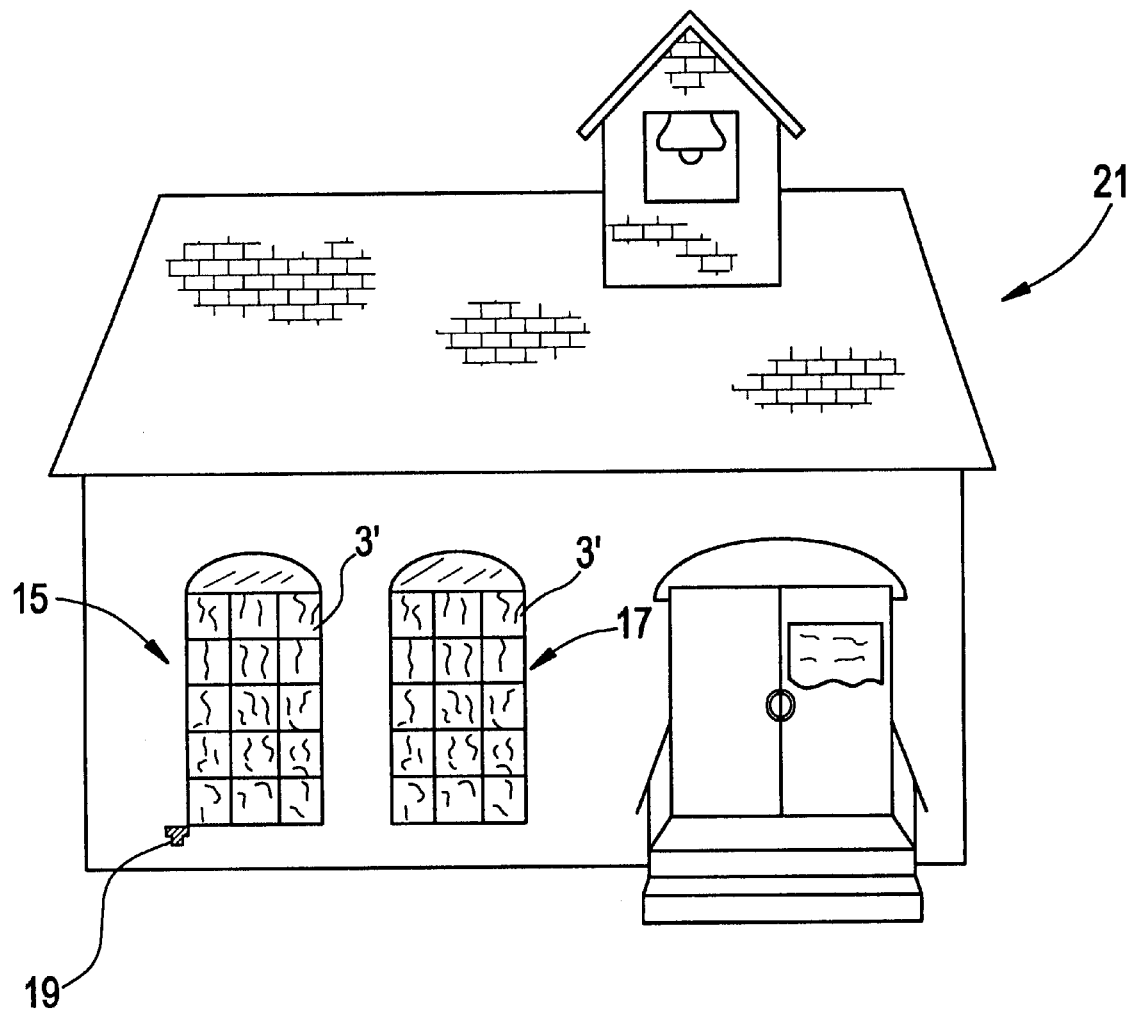
FIG. 6 is a front plan view of a church employing as its windows, glass block simulating sheets of glass either in tempered or untempered form according to this invention.
Figure 7:
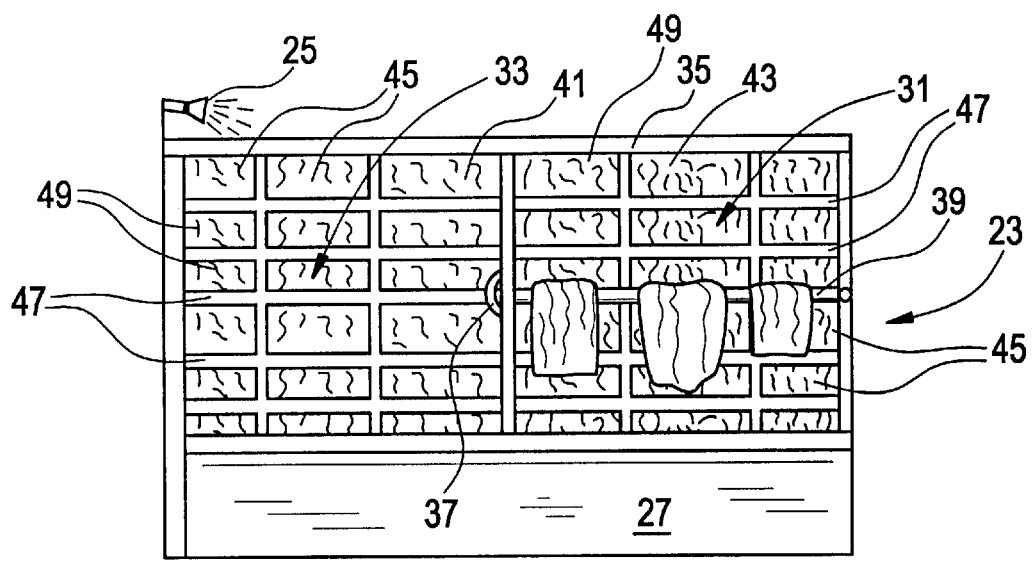
FIG. 7 is a side plan view of a shower stall employing as its doors, tempered glass block simulating sheets of glass according to this invention.

Reference is initially directed to FIGS. 5–7 wherein there is illustrated three different end uses for the temperable and tempered, patterned glass sheets of this invention. FIG. 5, for example, illustrates a popular use of an aesthetic glass block simulating wall in a professional's office, such as a separation wall in the waiting room of a dentist's or doctor's office. In such instances it is preferred, usually for safety reasons, that the glass sheet(s) be tempered. It is also necessary, of course, that the wall reasonably and aesthetically give the appearance from at least one side (e.g. the waiting room side) of a stack of glass blocks held together by translucent mortar at their joint edges.

As illustrated, wall 1 may be formed of a sheet (or multiple sheets in the case of a large wall) of glass 3 having its grid pattern facing the office waiting room, if embossed on only one side, and optionally provided with an opposing parallel patterned sheet (not shown) facing in the other direction. In the alternative, sheet 3 may be embossed on the both sides thereby eliminating the need for two opposing sheets. In either event the wall will be constructed using a conventional frame member 5 to secure the wall in place. If two opposing sheets are employed, they may be spaced or not spaced apart, preferably with their opposing grid patterns aligned. If spaced sufficiently enough apart, electric lighting may be provided in the space to create different three dimensional aesthetic effects.

The pattern imprinted into sheet(s) 3 includes a grid pattern of horizontal and vertical mortar simulating joints 7 and 9, respectively. This grid pattern 7, 9 is meant to simulate the roughness or "pitted" nature of mortar. How this is formed is described below. While this grid pattern may be formed of grooves in the planar surface of the glass, in the preferred embodiments of this invention they are raised ridges. In either event their depth below or height above, respectively, the planar surface of the sheet is maintained at less than 0.03 inches, and preferably less than 0.016 inches to thereby achieve temperability of the glass sheet.

Figure 1:
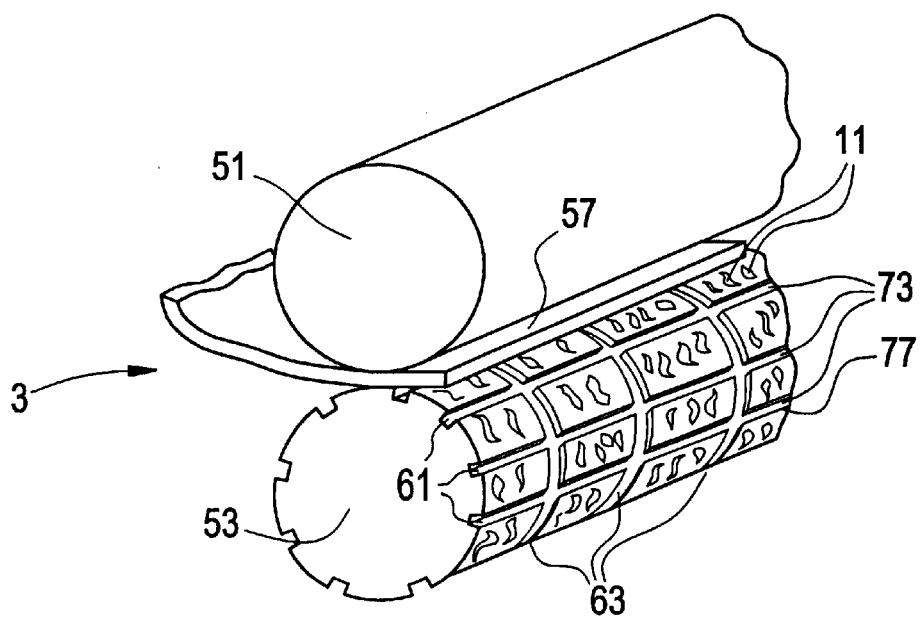
FIG. 1 is a partial perspective view of one embodiment of an apparatus for impressing a ridged grid pattern in a softened sheet of glass to create a temperable, mortar and glass block simulating sheet according to this invention.
Figure 8:
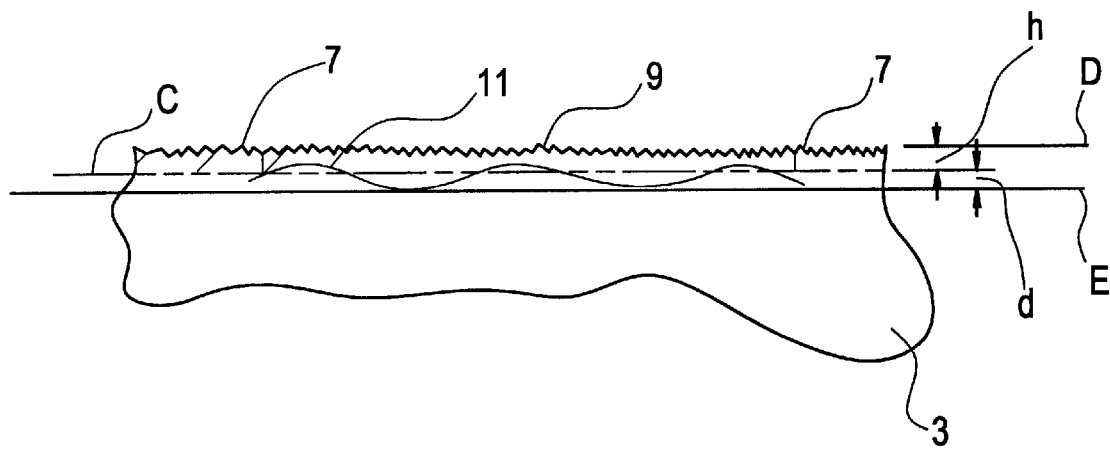
FIG. 8 is a partial sectional view of a sheet of glass according to this invention.

In addition to the grid pattern 7, 9, there is further provided, for rendering the sheet translucent (rather than transparent), a wavy pattern 11 in the faces of the individual blocks 13 outlined by the grid pattern 7 and 9. In a like manner to the ridges 7, 9 (or grooves), the wavy pattern should not have peaks or valleys which, combined, create a variation of 0.03 inches or more and preferably less than 0.016 inches, in order to assure temperability. As an illustration of such dimensional auditing in order to assure temperability, FIG. 8 illustrates the planar surface of glass sheet 3, as line "C". This line "C" which serves to define the term "planar surface" as used herein, is, in effect, the planar surface which the sheet would assume when emerging from the impressing process, if the impressing process were done without a pattern, such as where both rollers in FIG. 1 are smooth, and used solely to affect the thickness of the sheet. The concept here with regard to this term is the discovery of the dimensional limits in the abrupt changes which are necessary to adhere to in the glass surface in order to achieve an aesthetic glass block simulation while, at the same time, achieving reliable temperability.

Planar line "D" (FIG. 8) is the height "h" of ridges 7 and 9 above the original planar surface "C". It is noted that the height of the highest wavy pattern 11 for temperability should not, and thus does not as illustrated, exceed height "h". In addition, line "E" denotes the lowest plane to which a wavy pattern extends into the glass sheet 3. This then serves to define the depth "d" below original planar surface C to which the deepest wavy pattern 11 (or a groove if employed as the grid pattern) should extend.

Figure 8A:
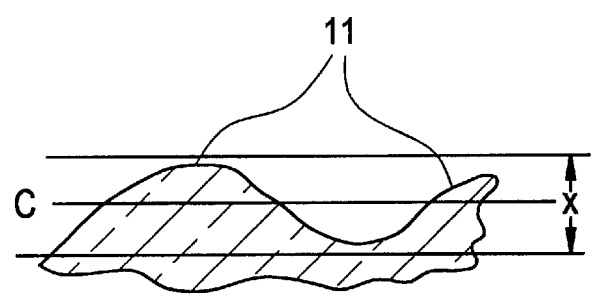
FIG. 8A is a schematic illustration of the sheet of FIG. 8 used to demonstrate the dimensional limits of the wavy patterns in the practice of this invention.

The dimensional limits given above for assuring temperability are to be maintained for height "h" or depth "d" in the case of ridges 4 or grooves 7 and 9, respectively. As for wavy pattern 11, the total change in elevation (peak to valley) of any given wave should be maintained within the above limits. This is illustrated in FIG. 8A schematically by the distance "x". The distance "x" should be less than 0.03 inches, and preferably less than 0.016 inches. As a specific example, in this respect, for the ridges (or alternatively, for the grooves). height "h" may be a nominal 0.0156 inches, while for the wavy pattern, distance "x" should be less than 0.0156 inches and preferably no individual wave should extend above the upper plane of the ridges (or below the lower plane of the grooves where grooves are employed).

FIGS. 6 and 7 simply illustrate two more uses to which the sheets of glass of this invention may be put. In FIG. 6 for example, patterned sheets 3', similarly patterned as sheet 3 in FIG. 5, may be employed as "stain glass" windows 15 and 17, respectively, in a church 21. Either or both of these windows may be tempered, or untempered as safety, or regulatory codes, may require. For example, in certain buildings, fire codes may mandate that one window, e.g. 15, be tempered and appropriately marked such as by the mark 19 for firemen to break during a fire, while to save money, the other window, e.g. 17, need not be tempered, but must match window 15 in appearance for aesthetic purposes.

In FIG. 7, another use for the temperable sheets of glass of this invention is illustrated. As shown in side view, an otherwise conventional bathroom shower stall 23 includes a shower head 25, a tub 27, and an enclosure door structure 29 typically comprised of two sliding door panels 31 and 33. Panels 31 and 33 include a metal frame structure 35, sliding door handle 37 and towel rack 39, all in conventional fashion. Frame structure 35 retains therein, in this instance, two patterned sheets of tempered glass 41 and 43, respectively, formed according to this invention to simulate, translucently, a stack of glass blocks 45 held together at their joints by ridged, simulated mortar pattern 47 and having in the simulated blocks 45, a wavy pattern 49 to create translucent privacy.

Figure 2:
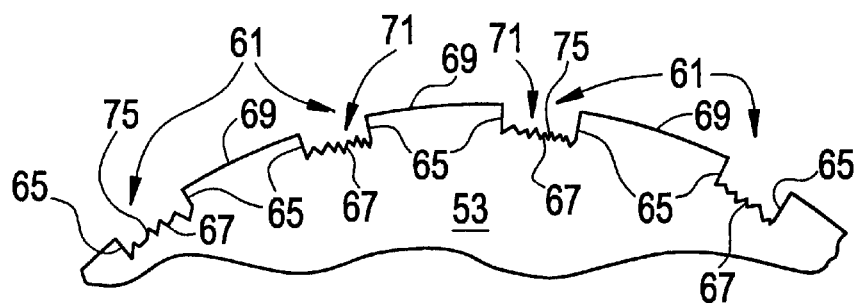
FIG. 2 is a partial end view of the bottom roller of FIG. 1.

Attention is now directed to FIGS. 1–2 in which there is illustrated, in partial form, a preferred roller technique and apparatus for impressing a ridge pattern according to this invention into a glass sheet. As shown best in FIG. 1, two rollers are employed. In the preferred embodiment, upper roller 51 is a smooth roller which maintains upper surface 57 of sheet 3 in a relatively smooth condition, while lower roller 53 has engraved in it (by any standard technique) the reverse grid pattern as discussed more fully below with respect to FIG. 2. In an alternative embodiment such as where both sides of sheet 3 are to be embossed, upper roller 53 will also be similarly engraved and the rotation of the two rollers will be controlled in a known way so as to align the patterns, if similar, when formed on the two sides of sheet 3.

Of course, it is also possible to have upper roller 51 engraved and lower roller 53 smooth, so as to engrave only upper surface 57 of sheet 3. For most applications herein, however, it is preferred that lower roller 53 be the forming, grid pattern impressing roller. The reason for this is to better insure the achievement of the ridge and wavy pattern consistently during the continuous operation with as few rejects as possible and to insure that the dimensions of the changes in the glass surface not exceed the limits as set forth above thereby to achieve a highly reliable product as to its temperability. Since at least the lower surface of the glass (not shown) is maintained at the proper, softened temperature for impressing, by using lower roller 53 as the grid embossing roller, gravity aids the flow of the softened glass into full engagement with the engraved surfaces thereby to create a consistent and uniform mortar appearing pattern of ridges and waves conforming very accurately to the dimensional limits designed into roller 53.

Turning now to FIG. 2, there is illustrated an enlarged view of a section of roller 53 so as to better demonstrate the nature of the reverse pattern formed (e.g. by engraving or any other conventional technique) in roller 53's circumferential outer surface. As can be seen grooves 61 for forming ridges 7 (the circumferential grooves 63 being perpendicular to grooves 61 as shown in FIG. 1) are formed in the outer circumference of roller 53. Grooves 61 each consist of a pair of side walls 65 and a bottom wall 67. Sidewalls 65 extend outwardly to upper circumferential surface 69 of roller 53. Opposing side walls 65 connected by bottom wall 67 thereby define a ridge forming cavity 71. Grooves 63 are constructed in a similar fashion to have bottom walls 73 and side walls 77 and to intersect perpendicularly with grooves 61.

In the preferred embodiments of this invention, the grid pattern includes a pattern of simulated glass block mortar normally used in building true glass block walls. In addition, the glass block portion of the pattern seeks to simulate true translucent glass blocks which have built into their outer surface a wavy pattern. With reference to FIG. 1, but particularly to FIG. 2, a simulated mortar appearance is quite acceptably achieved by forming (as by etching, sandblasting, etc.) a reverse "pitted" or "granular" pattern 75 into bottom walls 67 and 73. A reverse wave pattern is engraved or otherwise formed in upper surface 69 of roller 53 for impressing wave pattern 11 into sheet 3. Walls 65 and 77 may be perpendicular to their respective bottom walls or slightly outwardly diverging. In either event the dimension of cavities 71, the reverse waves in upper surface 69 and the granular pattern 75 in bottom walls 67 and 73 are all formed so as to be within the dimensional limits of the pattern set forth above thereby to achieve reliable temperability.

When bottom roller 53 is the pattern providing roller, conformance to the desired dimensional limits in the glass sheet, while achieving an aesthetic and reliably reproducible pattern, is best assured by making the aforesaid roller dimensions just slightly less than the prescribed dimensional upper limits. As stated aforesaid, minor glass flow by gravity into the various cavities and interstices insures close conformance and consistency in the glass sheet to whatever dimension is engraved in roller 53. For example, excellent reliability of pattern and temperability along with a very aesthetic appearance may be achieved by engraving in roller 53 grooves to a depth of 0.016 inches and a width of 0.500 inches. In one roller embodiment there may be nine circumferential grooves 61 with one such groove centered in the middle of roller 53 and five horizontal (perpendicular) grooves 63 evenly spaced around roller 53. The mortar pattern 75 may be, for example, a #2 sand texture. The length and circumference of, the rollers will be chosen to accommodate a particular size of glass sheet. A length of 69 inches and diameter of 12 inches (e.g. 11.9 inches) is one example.

The glass sheet may be clear or colored glass and a typical example of its thickness is a nominal and conventional ⅛ or 3/16 inch thick glass sheet (bottom planar surface-to-top planar surface). The thickness chosen is not critical, however, since this invention is applicable to a wide variety of glass sizes and thicknesses. Similarly, this invention is applicable to any known, conventional temperable glass composition. One example of such glasses is the known soda-lime-silica glasses used in window and door making. A particularly preferred glass composition for use herein, on an oxide basis, consists of:

| Ingredient | Wt. % |
|---|---|
| $SiO_2$ | 71.937 |
| $Na_2O$ | 13.257 |
| CaO | 10.175 |
| MgO | 3.609 |
| $Al_2O_3$ | 0.601 |
| $K_2O$ | 0.126 |
| $SO_3$ | 0.166 |
| $TiO_2$ | 0.031 |
| $Fe_2O_3$ | 0.101 |
| $Co_3O_4$ (ppm) | -0- |
| $Cr_2O_3$ (ppm) | 10.000 |
| Se (ppm) | -0- |

Figure 4:
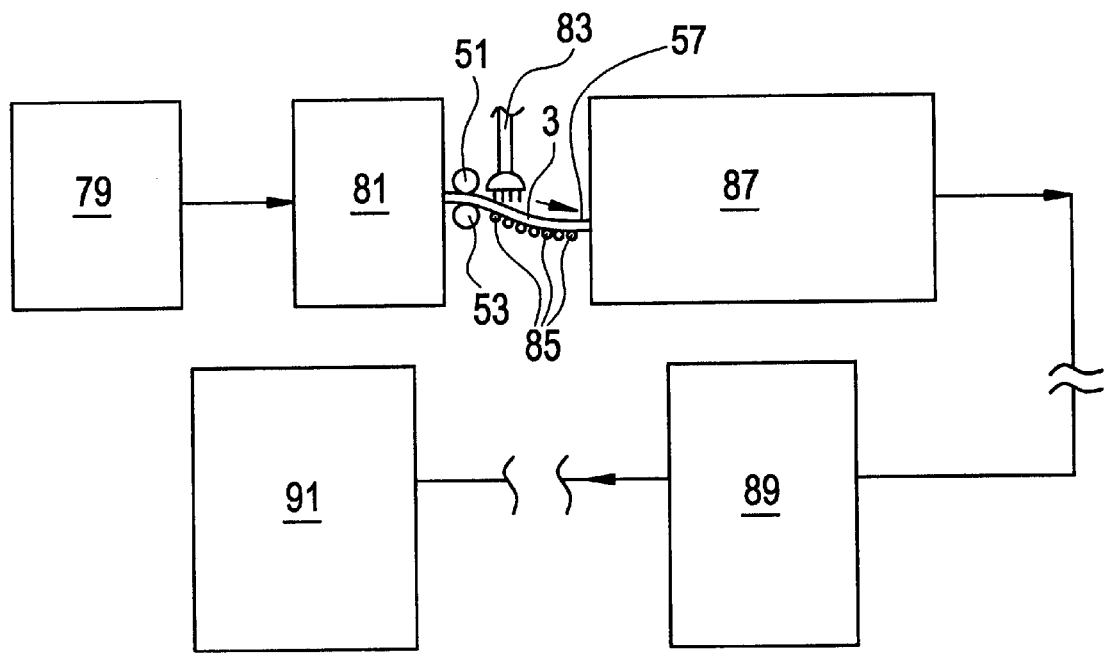
FIG. 4 is a schematic flow chart of an embodiment of one technique for creating a sized and tempered, mortared, glass block simulating sheet of glass according to this invention.

FIG. 4 is presented as a schematic flow chart of a typical operation which may be employed for forming a cut (to size) and thereafter tempered glass sheet according to this invention. Therein, in known fashion, glass batch is first melted in melter 79 and refined in forehearth 81. Near the end of forehearth 81 the molten glass is cooled and formed into a continuous sheet or ribbon of glass 3 and maintained at a temperature to keep it sufficiently soft so as to be readily impressed with a pattern by roller 53 without breaking sheet 3, as it is pulled under compressing roller pressure between rollers 51 and 53 to the proper dimensional limits. The glass should be sufficiently cool, however, so as to maintain the pattern impressed in rather precise nonflowable form.

A series of burners 83 may be employed on smooth top surface 57 after the pattern is impressed in its lower surface between the rollers. The principal purpose of these burners, operated intermittently in a known way to control the cooling process, is to keep sheet (ribbon) of glass 3 from warping. Water-cooled transfer rollers 85 serve to cool the glass sheet through contact with its lower surface. This stabilizes the dimensions of the pattern and transports sheet 3 at the proper temperature to conventional annealing lehr 87.

After being annealed the continuous, cooled sheet of glass 3 is then conveyed to a cutting station 89 where it is cut to meet the size needs of a particular end use. The discontinuous flow chart lines are used in FIG. 4 to indicate that cutting operation 89 may be on-site immediately following the annealing zone 87, or can be off-site when sheet 3 at ribbon forming zone 81 is made of a finite, noncontinuous length.

Finally, due to the unique nature of the pattern created in accordance with this invention, cut sheets 3 may be tempered either on site or off-site (as indicated by the discontinuous flow chart line) in tempering station 91 using conventional tempering techniques. In this respect, and in a conventional way, other substeps may be optionally employed among these basic stations prior to tempering. For example, after cutting the sheets to size in station 89, seamers may be employed to eliminate sharp edges in the patterned sheets. From the seamer station the sheets may then go through a conventional washing step to clean and remove any debris created by the seamer operation and from there to a logo printer to print the manufacturer's name, logo, etc. thereon.

Tempering is a conventional process and employs readily available apparatus purchasable commercially. One example of such an apparatus is made by Glass Tech, Inc. Using such apparatus, and as an example of a typical tempering process useful herein, a ten zone furnace is used to gradually heat a patterned glass sheet 3 to be tempered to a temperature of about 1380–1400° F., with an exit temperature of about 1130–1210° F. The heated glass sheet is then air quenched in three zones: (a) a primary high pressure air quench, (2) a medium pressure air quench, and (3) a low pressure cooling to approximately room temperature.

With reference again to ribbon forming zone 81 and the following rollers 51, 53; typical temperatures for the ribbon and its speed (conventionally stated in tons per day) as it enters the rollers 51, 53 from zone 81 are as follows:

1) for ⅛ inch glass at 85 tons per day, the exit temperature is about 2190° F.;
2) for 3/16 inch glass at 75 tons per day, the exit temperature is about 2150° F.; and
3) for 3/16 inch glass at 99 tons per day the exit temperature is about 2030° F.

These temperatures, it will be understood by the skilled artisan, will vary depending on the tonnage and may vary with the glass composition employed. The characteristic to be achieved is a softened glass which, when embossed into the sheet with the pattern by impressing the sheet between the rollers 51, 53, is not so soft so as to hold the pattern to its intended dimensions and shape in a consistent manner with as few pattern rejects and as little breakage as possible.

The technique of forming a sheet (ribbon) of glass between two rollers is well known in the art. The gap between the rollers is the principal factor in determining the ultimate thickness of the glass sheet. Thickness, to a lesser extent, may be effected by the speed of the rollers which is maintained in a conventional way, well within the skill of the glass artisan. Here, the important feature, achieved by simple routine adjustment, is to insure that the distance between the rollers 51, 53 is such as to create not only the requisite sheet thickness (normally very close to the actual distance between rollers 51, 53), but also to obtain a consistent presentation of softened glass within the engraved grooves and into interfacial relationship with the side walls, granular bottom walls, and upper wavy patter surfaces to insure conformance to the intended dimensions of the ridges (or grooves), wavy patterns and granular indentations, thereby to achieve reliable temperability as well as to achieve a consistent pattern with as few rejectable defects and/or breakage as is reasonably and economically feasible.

Figure 3:
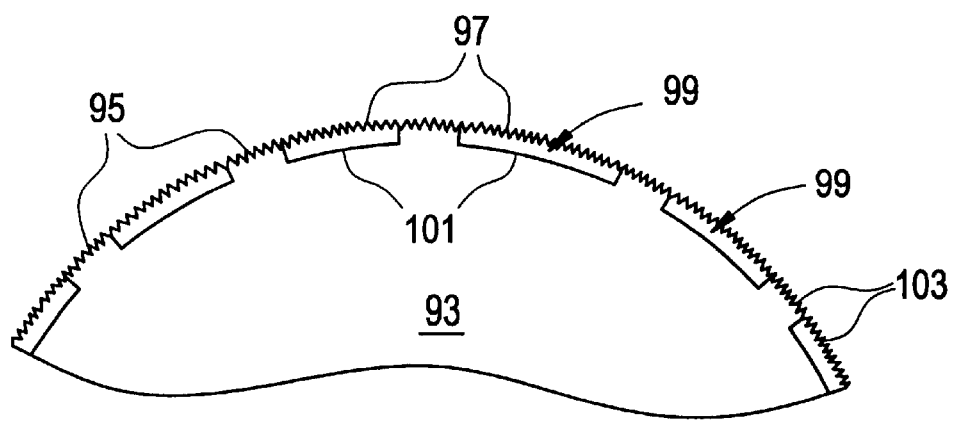
FIG. 3 is a partial end view of another embodiment of a roller useful in the practice of this invention, wherein the grid pattern is formed by mortar simulating grooves.

Attention is now directed to FIG. 3 wherein there is illustrated an alternative roller 93 (top or bottom, or both) for forming a block/mortar simulated glass block grid array, but where the mortar joints in the glass sheet are grooves rather than ridges. As can be seen, in this instance, while the dimensions are all maintained within the limits as described above, the engraving in roller 93 is the reverse of that in roller 53. On roller 93, for example, the mortar joint grooves (rather than ridges) in the sheet are formed by manufacturing into the roller horizontal lands 95 and vertical intersecting lands 97 thereby to form between them a series of block cavities 99. Bottom walls 101 of block cavities 99 then are provided with a wave forming pattern, while the top surfaces of lands 95 are provided with a granular surface 103 (such as was formed in bottom walls 67, 73). Side walls 105 of cavities 99 as well as the wave patterns and granular interstices are all maintained within the dimensional limits described above to insure temperability of the glass sheet formed.

Once given the above disclosure many other features, modifications, and improvements will become apparent to the skilled artisan. Such features, modifications and improvements are therefore to be considered a part of this invention, the scope of which is to be determined by the following claims:

I claim:

1. In a sheet of glass having a top planar surface and a bottom planar surface and being provided in at least one of said planar surfaces with a pattern which simulates a plurality of glass blocks which form joints with each other at their opposing edges, the pattern comprising a first set of at least two spaced and parallel ridges or grooves extending across said at least one planar surface and a second set of at least two spaced and parallel ridges or grooves extending across the at least one said planar surface in a direction perpendicular to said first set of ridges or grooves, wherein the improvement comprises said sheet of glass is temperable and said ridges or grooves extend from said planar surface a distance less than 0.03 inches.

2. A sheet of glass according to claim 1 wherein said pattern is defined by said ridges which extend to a height above the planar surface of said glass sheet in which said ridges are formed a distance no greater than 0.016 inches.

3. A sheet of glass according to claim 2 wherein said ridges are generally rectangular in cross-section and have a height of 0.0156 inches above said planar surface of said glass sheet.

4. A sheet of glass according to claim 3 wherein said ridges are comprised of an upper planar surface having a finite width substantially parallel to said planar surface of said glass sheet from which said ridges extend and wherein said upper planar surface of said ridges include therein a granular pattern which simulates the appearance of glass block mortar.

5. A sheet of glass according to claim 4 wherein the portions of said at least one planar surface located between said block simulating pattern of perpendicular ridges includes a light diffusing wavy pattern whose combined height and depth of any wave above and below the plane defined by the original planar surface of said glass sheet in which said wavy pattern is formed is no greater than 0.016 inches.

6. A sheet of glass according to claims 1, 2, 3, 4 or 5 wherein said sheet of glass is tempered.

7. In the method of making a sheet of glass comprised of a top planar surface and a bottom planar surface, said method including the step of forming in at least one of said planar surfaces a plurality of grooves or ridges patterned to simulate joints between a plurality of opposing glass blocks, the improvement comprising wherein said sheet of glass is temperable and wherein said step of forming said plurality of said grooves or ridges includes forming said grooves or ridges in said planar surface so as to extend from said planar surface a distance less than 0.03 inches.

8. In the method of claim 7 wherein said method further includes after forming said grooves or ridges the step of tempering said glass sheet.

9. In the method of claim 7 wherein said pattern consists essentially of ridges.

10. In the method of claim 9 wherein said ridges are formed to a height of no greater than 0.016 inches.

11. In the method of claim 7 wherein said method includes forming in said at least one planar surface of said glass sheet a first set of spaced and parallel ridges extending across said at least one planar surface of said glass sheet and a second set of at least two spaced and parallel ridges extending across said at least one planar surface of said glass sheet in a direction perpendicular to said first set of ridges thereby to simulate a plurality of substantially rectangular glass blocks having mortared edge joints therebetween as defined by said ridges.

12. In the method of claim 7 wherein said ridges are formed so as to have an outer planar surface, the method further including the step of forming in said outer planar surface of said ridges a granular pattern to simulate a mortared joint between said simulated glass block.

13. In the method of claim 7 wherein said simulated glass blocks are comprised of an outer surface outlined by said ridges, and wherein the method further includes the step of forming in said outer surface of said simulated glass blocks a light diffusing wavy pattern the combined height and depth of any wave above and below the plane defined by the planar surface of said glass sheet in which said wavy pattern is formed is no greater than 0.016 inches.

14. A simulated mortared glass block wall comprising a frame structure retaining therein a tempered sheet of glass according to claims 1, 2, 3, 4 or 5.

15. A simulated mortared glass block window comprised of a window frame retaining therein a tempered sheet of glass according to claims 1, 2, 3, 4 or 5.

16. A simulated mortared glass block shower stall comprised of a shower stall frame member retaining therein a tempered translucent sheet of glass according to claims 1, 2, 3, 4 or 5.

17. A sheet of glass according to claim 5 wherein the height of any said wave in said wavy pattern does not exceed the height of said ridges.

* * * * *